Figure 1:
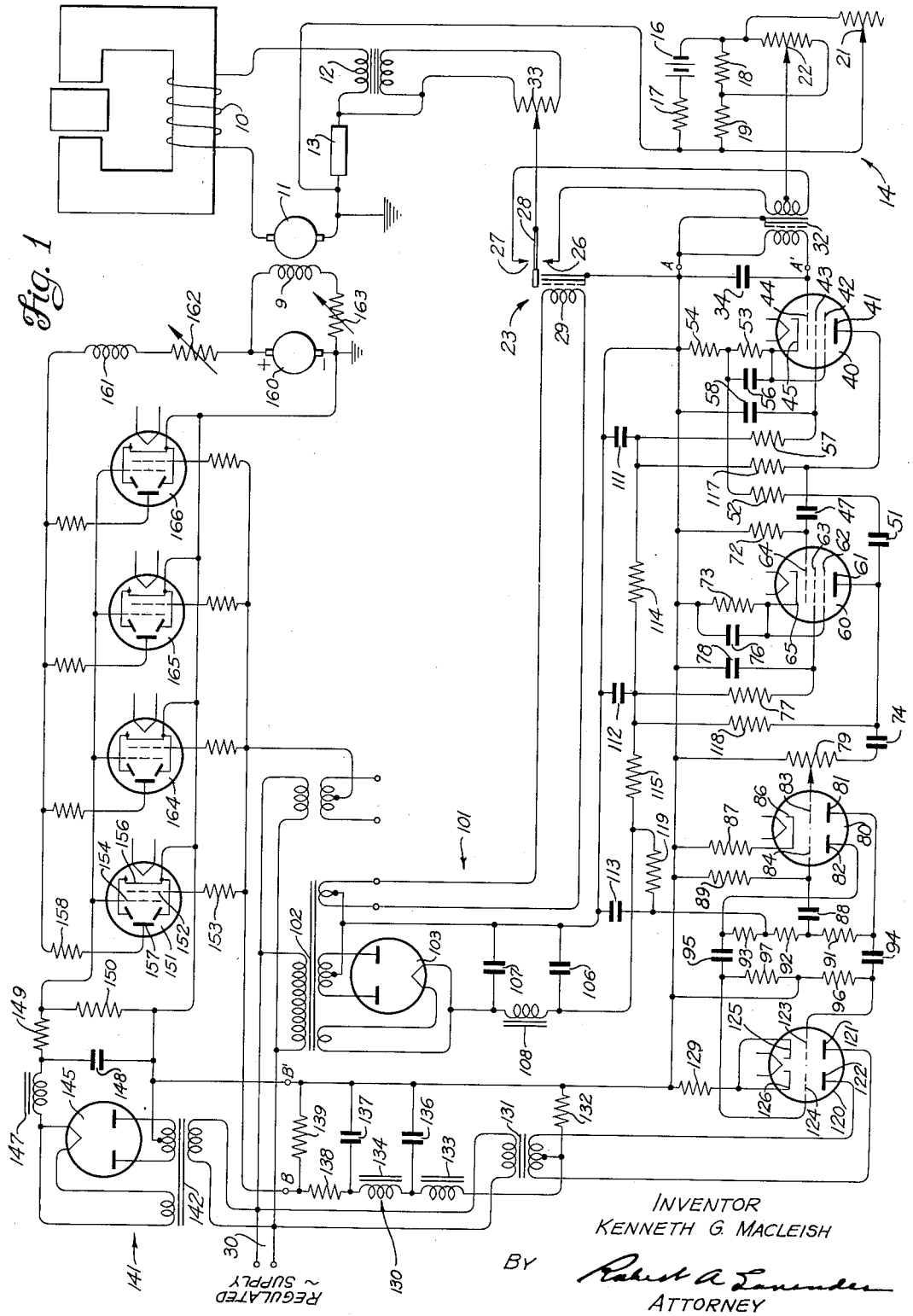

Feb. 14, 1956 K. G. MACLEISH 2,735,044
MAGNETIC FIELD REGULATOR
Filed Nov. 21, 1947 2 Sheets-Sheet 2

INVENTOR
KENNETH G. MACLEISH
BY Robert A. Lavender
ATTORNEY

United States Patent Office 2,735,044
Patented Feb. 14, 1956

2,735,044

MAGNETIC FIELD REGULATOR

Kenneth G. Macleish, Rochester, N. Y., assignor to the United States of America as represented by the United States Atomic Energy Commission Application November 21, 1947, Serial No. 787,380

7 Claims. (Cl. 317—123)

This invention relates to apparatus for precise control of the field of electromagnets and more specifically relates to an improved electromagnet regulator capable of providing the accuracy of magnet field regulation necessary in the electromagnetic separation of isotopes.

The particular art above mentioned comprises a new field within the scope of nuclear physics. Until recently it had been generally accepted that all matter was made up of 92 elements. Furthermore these elements were supposedly composed of a number of atoms, each of said atoms being identical. Following this reasoning still further, a division of any of said elements would result in identical units no matter how many or few divisions were made.

This reasoning has been revised within the last few years. It has been found that an element may be composed of various substances being alike chemically but differing physically in the matter of nuclear mass. These components of elements differing only in nuclear mass are called isotopes.

The commercial separation of isotopes has proven to be an immense problem which is yet in the process of solution. To date the most feasible solution to this problem has been by the use of a calutron as presented in the copending case of Ernest O. Lawrence, Serial No. 557,784, and now Patent No. 2,709,222, issued May 24, 1955.

For the efficient operation of a calutron, it is necessary for the relation between accelerating voltage and magnet field strength to be maintained to a high degree of accuracy. While it is possible for both accelerating voltage and field strength to vary as long as a certain relationship is maintained between them, it has been found that more satisfactory results are obtained by maintaining the field strength constant and varying the accelerating voltage. Said field strength must be so maintained that its variations will be limited to at most one part in 5000 for quick changes and one part in 1000 for slow drift.

The magnets used in the art of isotopic separation are so constructed that their reluctance is due mainly to air gaps, and, as the inductance of these magnets is very high in comparison with their direct current resistance, the field strength assumes a linear relationship with the current energizing the magnet windings. For this reason it is feasible to control the magnet field strength by controlling the current to the magnet windings. Without regulation the field strength would vary several per cent, due in part to line voltage variations and to resistance changes with temperature.

The general form followed by previous regulators used in this work combines a current sampling means, usually a shunt resistor, further means for comparison between this sample and a standard voltage, one or more stages of voltage amplification, and a means of power amplification, thereby providing a signal of sufficient strength to control a generator supplying current to the magnet windings.

With the above-mentioned arrangement a quick or sudden variation of magnetizing current causes the regulator to oscillate about the normal operating point, and the dampening time of these oscillations is one measure of the effectiveness of regulation.

The input signal of the regulator is naturally quite small as it is merely the algebraic sum of the shunt voltage and reference voltage. In view of the small input signal, a high amplification is necessary to produce a resultant signal sufficiently large for control purposes. Both of these facts, low input and high amplification, present inherent difficulties in that the low input signal may easily be overshadowed by a disturbance usually considered negligible such as generator commutator ripple, and that an electronic system having an amplification of such magnitude possesses a tendency to support oscillations within itself.

A copending magnet regulator case, Serial No. 679,978, by Kenneth R. MacKenzie filed June 28, 1946, now Patent No. 2,468,678, issued April 26, 1949, presents an early attempt to provide the precision of control necessary for the operation of a calutron. This and subsequent regulator cases have endeavored by various means to overcome to a certain extent the difficulties described above. However, it has been found that as work progressed in the field of isotopic separation by electromagnetic means, equipment of greater capacity and more precise control was necessary. In order to attain the magnet field stability necessary for further progress in calutron operation, the difficulties herein described had to be minimized in the present invention to an extent not hitherto believed possible.

In the light of the foregoing discussion it is an object of this invention to provide an improved electromagnet regulator.

It is a further object of this invention to provide an improved electromagnet regulator capable of maintaining the flux, between pole faces of a magnet, constant within at least one part in 5000 for sudden changes and one part in 1000 for slow drift.

Another object is to provide an improved electromagnet regulator capable of providing the above stated accuracy without the attendant oscillations peculiar to any system striving for such sensitivity.

Another object of this invention is to provide an electromagnet regulator so designed and equipped as to be independent of extraneous influences from the load circuit so as to provide the requisite accuracy without oscillatory actions.

A still further object of this invention is to provide an improved electromagnet regulator having such internal connections and elements that, notwithstanding the magnitude of amplification, oscillations are neither initiated nor supported by said internal arrangements.

An outline of the components of my improved electromagnetic regulator and the method used to integrate their operation in order to fulfill the above objects may be obtained by a general reference to the accompanying drawings. Figure 1 shows the electrical connections of one specific embodiment of my invention and Fig. 2 shows the electrical connections of another specific embodiment particularly well adapted to the control of a very strong magnet field.

Now, referring to Fig. 1 in general, the windings 10 of a magnet are connected across the terminals of a generator 11 with a series combination of a resistor 13 and the primary winding of a dampening transformer 12 in the negative lead of said generator. A control unit 14 compares any desired portion of a standard voltage to the voltage across the shunt resistor 13. The resultant signal from said comparison is applied to a mechanical vibrator 23 which converts said D. C. signal to a sixty cycle square wave signal which is then amplified by two vacuum tubes 40 and 60 in series. Advantage is made of a degenerative feedback in this amplification stage to make the amplification dependent only upon percentage feedback. The amplified signal is then passed into a rectification unit consisting of a phase inverter 80, a rectifying tube 120, and a filter 130. The D. C. output of this rectifier unit is applied to the control grids of a number of tubes connected in the field circuit of an exciter 160 which energizes the field 9 of the main generator 11. The signal applied to the output tubes determines their impedance thereby controlling the current through the exciter field and consequently controlling the generator field excitation.

Figure 2:
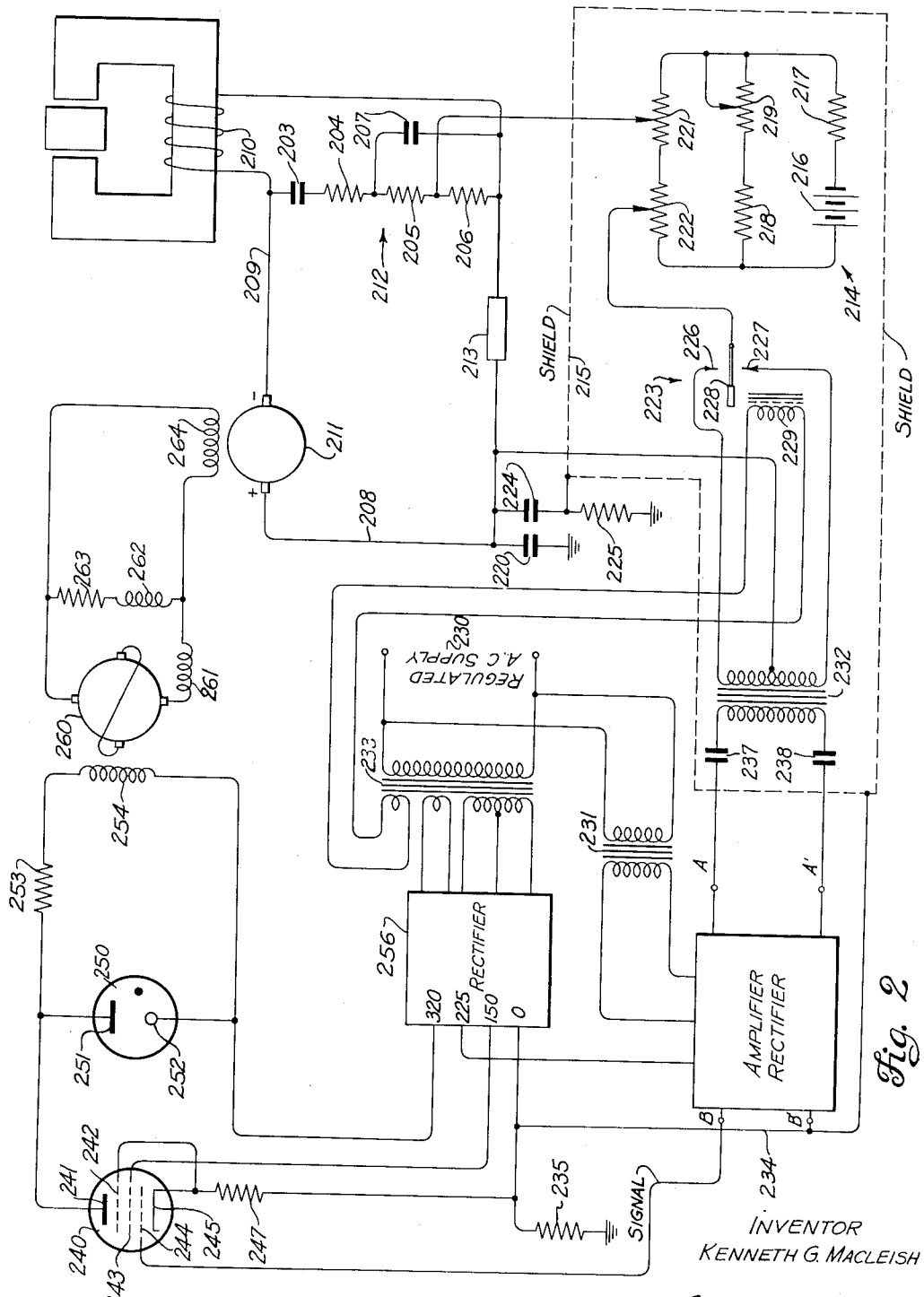

With reference to the specific embodiment shown in Fig. 2, the amplifier and rectifier units are identical to those of Fig. 1 and thus they are shown only as a box, however, the input and output circuits are shown in detail as they differ from those of Fig. 1. As may be noted from Fig. 2 the magnet windings are operated ungrounded and a shunt resistor is placed in the positive generator lead 208 while a dampening signal is obtained from a resistance-capacitance network instead of from a dampening transformer as in Fig. 1. The low level parts of the regulator are enclosed in a shield 215 which is grounded through resistances 225 and 235 and is connected to the positive generator lead 208 through a condenser 224. The positive generator lead 208 is also grounded through a condenser 220 in order to reduce commutator ripple and the amplifier and rectifier units are protected from high frequency interference by blocking condensers 237 and 238. The output circuit includes a power supply 256 energizing a control field 254 of a high gain electromechanical power amplifier 260 through a variable impedance vacuum tube 240 with said high gain electromechanical power amplifier 260 energizing the field 264 of the generator 211.

A more detailed reference to Fig. 1 shows that the magnet circuit consists of magnet windings 10 energized by a generator 11 with a dampening transformer 12 and shunt resistor 13 in series combination between the negative generator terminal and said magnet windings. The voltage developed across the shunt resistor 13 is fed into a control unit 14, comprising a battery 16, resistors 17, 18, 19 and control potentiometers 21 and 22. Within the control unit 14 a desired portion of the standard voltage from battery 16, as determined by the coarse control 21 and fine control 22, is compared to the shunt resistor voltage. Thus by the setting of the control potentiometers 21 and 22 the amount of standard voltage that is compared to the shunt resistor voltage may be so controlled that the resultant signal from the control unit will maintain any desired magnet field strength. The direct current signal from the control unit 14 is converted to an alternating current signal of a sixty cycle square wave form having a magnitude proportional to the D. C. signal. This conversion is accomplished by a mechanical vibrator 23 of the vibrating reed type having two points 26 and 27, a reed 28, and an A. C. magnet winding 29 energized by an external regulated power supply 30. The points of the converter 23 are connected across the primary winding of an input transformer 32 which has its midpoint connected to the adjustable contact of the fine control potentiometer 22.

In addition to the signal supplied by the shunt resistor 13, a compensating signal is developed across the secondary of a dampening transformer 12. This induced signal is equal and opposite to any A. C. voltage across the shunt for frequencies of the order of a cycle per second which if not canceled out would set up oscillations in the amplifier stages, however the induced signal will have slight effect on slow variations of magnet current. The above signal is impressed on the converter reed 28 through a variable resistor 33.

A condenser 34 is connected across the secondary of the input transformer 32 in order to eliminate high frequency oscillations in the subsequent amplification stages.

The signal from the input transformer 32 is applied to the control grid 44 of a pentode amplifier tube 40. The output of tube 40 is applied from its plate 41 through a coupling condenser 47 to the control grid 64 of a final pentode amplifier tube 60. In order to stabilize the operation of the amplification unit a feedback circuit is provided connecting the plate 61 of tube 60 through a condenser 51 and dividing resistor 52 to the cathode circuit of tube 40. The feedback circuit is connected into the cathode circuit of tube 40 between two resistors 53 and 54, the first of which is tied directly to the cathode 45 and the other is grounded, thereby providing the feedback voltage between said connection and ground. In addition to the connections above-mentioned the elements of tube 40 are connected as follows: a by-pass condenser 56 in parallel with cathode resistor 53, suppressor grid 42 connected directly to cathode 45, screen grid 43 energized from plate supply circuit through resistor 57 and grounded through condenser 58. The second amplifier stage, namely vacuum tube 60, has its elements connected as follows: cathode 65 grounded through resistor 73 in parallel with by-pass condenser 76, control grid 64 grounded through grid leak resistor 72 in addition to being connected to the plate 41 of tube 40, screen grid 63 connected to the plate supply circuit through resistor 77 and grounded through condenser 78, suppressor grid 62 directly connected to cathode 65.

Following the amplifier stages is a rectifier unit containing a phase inverter 80, a full wave rectifier tube 120 and an output filter 130. The phase inverter 80 is a twin triode vacuum tube having plates 81 and 82, grids 83 and 84 and cathode 86. The cathode is connected to ground through a biasing resistor 87. The right-hand grid 83 is connected to an adjustable contact of resistor 79 one end of which is grounded, thus providing a gain control, and the other end of which is connected to a coupling condenser 74 which is tied to the plate 61 of tube 60 thus providing an input signal for the phase inverter 80. The right-hand plate 81 of tube 80 is connected through a resistor 91 and condenser 88 to the left-hand grid 84, which is grounded through grid leak resistor 89. As a small fraction of the plate signal of the right-hand unit of the phase inverter is impressed on the control grid of the left-hand element it is evident that the output of the two elements are of opposite phase. In order to maintain the signal from each plate of the phase inverter equal, two resistors 96 and 97 in series are placed between the plate leads with the point between said resistors being grounded.

The plate potential of the amplifier tubes and phase inverter is maintained by a full wave rectifier unit 101. This unit consists of a transformer 102 energized by an external regulated A. C. power supply 30, a full wave rectifier tube 103 and a π section output filter composed of two condensers 106 and 107 and a choke coil 108. The secondary winding of said transformer 102 in addition to supplying the rectifier tube 103, has tapoffs so connected as to energize the converter magnet 29 and the tube filaments of the amplifier unit and rectifier unit. Attached to the output filter of this plate supply rectifier is a power supply circuit consisting of condensers 111, 112 and 113 and resistors 114 and 115. To this circuit is connected the plate 41 of tube 40 through resistor 117, the plate 61 of tube 60 through resistor 118, the plate 82 of tube 80 through resistors 93 and 119 and the plate 81 of tube 80 through resistors 91, 92 and 119, said connections being made at appropriate points in the power supply circuit so that proper plate potentials are supplied to these tubes. Blocking condensers 88, 94 and 95 are placed in the output plate leads and left-hand grid lead of the phase inverter 80 in order to keep the D. C. plate supply potential from interfering with the A. C. regulator signal.

The two equal, oppositely phased, signals from the phase inverter are impressed on the grids 123 and 124 of a full wave rectifier tube 120. The cathodes 125 and 126 of said rectifier tube are joined and grounded through a biasing resistor 129. The plates 121 and 122 of rectifier tube 120 are connected across the secondary of a plate transformer 131 the primary of which is energized by a regulated power supply 30. The rectified signal is taken from the center tap of said plate transformer 131, which is grounded through resistor 132, and applied to a filter 130 comprising two choke coils 133 and 134 and two condensers 136 and 137. Following said filter, two resistors 138 and 139 are inserted in the circuit, one in series and one across the line, in order to reduce the signal applied to the output unit so that the maximum voltage from the rectifier 120 will be just sufficient to cut off the output tubes, thus causing the normal operating point of the voltage amplifier to lie in the range of maximum response.

The output stage of the regulator consists of four beam power tubes connected in parallel combination, said combination being in series with the field 161 of an exciter 160 for the main generator field 9. A full wave rectifier unit 141 is provided to maintain a constant screen grid potential on the output tubes. Said rectifier unit consists of a transformer 142 energized from an external regulated A. C. power supply 30, a full wave rectifier tube 145 energized by said transformer 142, and an output filter and voltage divider. The filter consists of a choke coil 147 and a condenser 148, and the voltage divider comprises a series resistor 149 and a shunt resistor 150 whereby a proper voltage is maintained on the screen grids of the parallel combination of output tubes.

In explanation of the connections of the output tubes, tube 151 may be considered as an example. The input signal from the regulator filter 130 is applied to the control grid 152 through a resistor 153, and the potential is maintained on the screen grid 154 by the aforementioned rectifier unit 141. The cathode 156 of said tube 151 is connected to the negative terminal of the exciter 160, which is grounded, and the plate 157 is connected through resistor 158 to the exciter field winding 161 which is further connected to the positive terminal of the exciter through a variable field resistance 162. The resistor in the plate lead and the one in the control grid lead are inserted to eliminate parasitic oscillations which would otherwise be initiated.

The connections of each of the other output tubes 164, 165 and 166 are identical to those just described for tube 151 and therefore are not individually described.

The output stage then, consists of four beam power vacuum tubes arranged in a parallel combination, said combination being in series with the field of a self-excited exciting generator 160 which energizes the field 9 of the main generator 11 through a variable resistance 163 in series with said main generator field 9.

Various elements included in the above description have purposes which may not be immediately apparent and, as some of these greatly influence the results obtained, their purpose is herein further described.

Through experience with previous magnet regulators it has been found that some sort of initial dampening arrangement is necessary. My research has further shown that a current transformer used for this purpose is least susceptible to interference from stray alternating fields. Considering the present case, an alternating current passing through the shunt resistor 13 will also pass through the primary of the dampening transformer 12 inducing an equal and opposite voltage in the secondary of this dampening transformer, and thus canceling out any A. C. signal, which in view of the small size of the D. C. shunt signal may be comparable in magnitude to it. Of primary interest in this case are frequencies of the order of one cycle per second which if allowed to enter the amplification unit would be passed on through the regulator circuit and out the generator in an amplified form subsequently resulting in oscillations. The voltage induced by the dampening transformer effectively cancels these A. C. voltages without affecting the much lower frequencies which are controlled by the regulator.

A condenser 34 is placed across the secondary terminals of the input transformer thereby eliminating high frequency oscillations in the amplifier stage. Without this condenser to by-pass high frequency voltages to ground, oscillations of the order of 2–4 kilocycles arise in the amplifier and increase in magnitude until they overshadow the impressed signal.

Serious difficulty has been experienced in previous regulators due to the variation of amplification with variations in supply voltage. This problem has been attacked in two ways in this regulator. In the case of the amplifier stages a feedback system has been utilized, thus with a high feedback the amplification is dependent only upon the percentage feedback. In addition a full wave rectifier unit 101 energized by a regulated A. C. power supply 30 is used to supply a constant potential to the plates and screen grids of the amplifier tubes and plates of the phase inverter. Thus the amplification of the phase inverter and amplifier tubes is stabilized in so far as supply voltage variations are concerned. In addition to stabilizing the supply voltages the rectifier unit increases the available D. C. plate potentials thereby increasing the possible amplification to an extent that, notwithstanding the amplification loss due to feedback, the actual amplification is increased over that possible in previous regulators.

It is evident from the description of the circuit that were the voltages applied to the grids 123 and 124 of the rectifier 120 of sufficient magnitude and of opposite phase from their respective plate voltages as supplied by transformer 131, the rectifier tube would not fire and no signal would be passed by this stage. Actually this condition may occur depending upon the relative magnitudes of the shunt resistor voltage and the standard battery voltage. In the case where the shunt resistor voltage is less than the standard voltage the regulator signal is of opposite polarity from the case where the shunt resistor voltage is greater than the standard voltage. A change of polarity in the D. C. signal applied to the converter 23 results in a 180° phase shift in the A. C. signal from the converter and thus if the signal from the control unit changes polarity and is of sufficient magnitude the rectifier tube will be operating in the cutoff region and pass no signal. Although this described action may occur in the normal operation of the regulator it will also occur if the rectifier tube 120 is improperly connected to the transformer 131 and thereby influence the plates of said rectifier tube with voltages of opposite phase from that required for proper operation. In addition, the voltage supplied to the plates of the rectifier tube 120 must be in synchronism with the voltage energizing the magnet of the converter 23 or a phase shift will be introduced which will vary the operation of the rectifier and thus the signal from said rectifier will not be proportional to the input signal.

A voltage divider is placed between the rectifier filter 130 and the output tubes in order to reduce the signal supplied to the control grid of the output tubes. The voltage from the rectifier is reduced so that the maximum signal passed by he divider will just cut off the output tubes. By this means the voltage amplification unit is constrained to operate in its most efficient range which in this specific case results in an optimum amplification of approximately $2.5 \times 10^6$ between the shunt 13 and the rectifier output.

In considering the operation of my improved electromagnet regulator a variation in magnet field strength may be assumed and the resultant action of the elements of the regulator noted. Granting the regulator be energized and the generator supplying the magnet winding at a fixed rate predetermined by the settings of the control potentiometers 21 and 22, consider the case in which for any reason the magnet field strength increases. This increase is the result of a greater current flowing through the windings which also flows through the shunt resistor thereby producing a greater voltage drop across said resistor. This greater voltage when compared with the standard voltage from the battery 16 produces a greater resultant signal. This larger signal is converted to a 60 cycle square wave voltage of greater magnitude than normal by the mechanical vibrator 23. The A. C. signal from said mechanical vibrator 23 is applied to an input transformer 32 where it is amplified and applied to the control grid 44 of a pentode amplifier tube 40. The amplified signal from tube 40 is applied through a coupling condenser 47 to the control grid 64 of pentode vacuum tube 60 where it is further amplified. From the plate 61 of tube 60 a portion of the amplified signal is fed back through a condenser 51 and a dividing resistor 52 to the cathode circuit of tube 40 where a feedback voltage is developed across a resistor 54 to ground. The amount of amplified signal fed back into the first amplifier stage is sufficient to make the amplification independent of everything except per cent feedback thus stabilizing the operation of this unit.

The portion of the signal from the amplifier tube 60 not fed back passes through a coupling condenser 74 and through a grounded variable resistor 79 from which a desired portion of the signal is applied to the right grid 83 of a twin triode vacuum tube 80 which acts as a phase inverter. The setting of the adjustable contact on variable resistor 79 determines the amount of the amplified signal applied to the phase inverter and thus controls the gain of the system. The signal applied to the right grid 83 of tube 80 is further amplified and enters the plate circuit where a small fraction of said signal, as determined by resistor 91, is applied to the left grid 84 of the phase inverter 82 and is amplified. The two plate signals from the phase inverter are necessarily of opposite phase as the plate signal from the right side is applied to the grid of the left, however in order to insure an equality of magnitude between these signals the two plate circuits are joined by two equal resistors 96 and 97 in series, their point of connection to each other being grounded. Following the phase inverter and attendant circuit elements is a full wave rectifier unit. The two equal and opposite signals from the phase inverter are applied to the grids 123 and 124 of a rectifier tube 120 which has its plate potential supplied by a transformer 131. Assuming the plate voltage of this tube to be in synchronism with the voltage supplied the converter magnet 29, the necessity for which is explained in detail in the circuit description, the output of the rectifier will be a D. C. signal fluctuating at 120 cycles per second and whose magnitude is proportional to the shunt resistor voltage. This pulsating D. C. signal from the rectifier tube 120 is passed through a filter 130 which removes practically all of the fluctuations.

The plate potentials for the amplifier tubes and phase inverter tube are supplied by a full wave rectifier unit 101 energized by an external, regulated, A. C. power source. By the use of this rectifier unit a constant plate supply is assured for the amplified tubes and phase inverter tube thereby eliminating the possibility of amplification variations within the regulator which would be detrimental in the fact that the regulator would tend to correct for such variations within itself and thereby produce an incorrect regulating signal. Also the additional power that is available from the rectifier unit over that of previous regulators is sufficient, that even though feedback is used, the total amplification of my improved regulator is greater than that of previous models.

The amplified D. C. signal from the rectifier filter 130 is reduced by a series resistor 138 and a resistor to ground 139. This reduction amounts to approximately 50 per cent and is made in order that the maximum signal applied to the grids of the output tubes will be just sufficient to cut off their operation and also in order that the amplifier stages, tubes 40 and 60, will operate in their range of maximum response.

The signal from the resistors 138 and 139 is applied to the control electrode of each of the beam power output tubes 151, 164, 165 and 166; in the case of tube 151 this control electrode is grid 152. The output tubes are connected in parallel so that potentials applied to one are also applied to all others. Each of the output tubes has its screen grid potential maintained by a full wave rectifier unit 141 energized by a regulated A. C. power supply 30. The parallel combination of output tubes are arranged in series with the field 161 of the exciter 160. Thus as the greater signal, resulting from the originally assumed magnet field strength increase, is impressed on the control electrodes of the output tubes their impedance is increased thereby reducing the current flowing through the field 161 of exciter 160. As the exciter field excitation is reduced the exciter output drops off thereby reducing the main generator field excitation and bringing about a decrease in generator output current equal to the original increase and thus returning the magnet field strength to normal.

In the hypothetical case considered above, the dampening transformer 12 plays no part in the operation of the regulator if it is assumed that the current supplied to the magnet windings has a frequency of variation at most of one cycle per minute. However this actually is not the case as various voltage frequencies are present in the main generator output, however the reactance of the magnet winding is so high that any current variations are of the order of a few cycles per second. Thus the dampening transformer 12 has been designed to induce in its secondary a signal equal and opposite to the shunt resistor signal for current variations of this frequency order, thereby canceling any such A. C. signal developed across the shunt resistor 13. By this means these certain objectional frequencies are automatically eliminated before they can enter the regulator amplifier unit and set up oscillations.

In the case of a large or sudden variation of the magnet field strength, possibly caused by a momentary speed change of the motor driving the main generator, a voltage would be induced in the secondary of dampening transformer 12 which would be opposite to the A. C. voltage developed across the shunt resistor 13. As the secondary of the dampening transformer is connected to the converter 23, the A. C. voltage developed across said transformer will greatly reduce the A. C. voltage developed across the shunt resistor 13, thus preventing overly large signals from entering the regulator which, if not reduced, would subsequently cause a hunting action of the generator.

It is apparent that many modifications of my improved electromagnet regulator are possible within the spirit and scope of the invention. One specific embodiment particularly well adapted to the control of very large magnets is presented below.

Magnets drawing a large current, say of the order of ten thousand amperes, require a very large main generator, and consequently, a large excitation generator must be used to properly excite the field of said main generator. However a conventional exciter of sufficient capacity to fulfill the requirements in this case would have a time constant too large in comparison with that of the magnet for precise control. For this reason the exciter is replaced by a high gain electromechanical power amplifier which is characterized by high speed of response. By properly controlling said power amplifier it may have an effective time constant of approximately 0.13 second compared with about 0.4 second for a conventional generator of comparable power rating.

Fig. 2 shows an electromagnet regulator capable of precisely controlling a magnet of very high field strength. Differences from Fig. 1 are shown in detail and described below.

By referring to Fig. 2 it may be seen that magnet windings 210 are energized by a generator 211 through positive and negative leads 208 and 209 respectively. A signal proportional to any current change in the magnet windings 210 is obtained from a shunt resistor 213 placed in the positive generator lead 208. In addition to this signal a dampening signal is obtained from dampening circuit 212 connected from the negative side of the shunt resistor 213 to the negative generator bus 209. This dampening circuit consists of a condenser 203, and resistors 204, 205 and 206 connected in series respectively from the negative lead 209 to the positive lead 208. The signal developed by this circuit 212 is proportional to a change in the voltage across the magnet windings 210. A small fraction of the voltage drop across the dampening circuit 212, that across resistor 206, is combined with the shunt resistor voltage to form the D. C. input to the regulator. A by-pass filter condenser 207, contained in the dampening circuit 212, prevents the high frequency generator commutator ripple from reaching resistance 206 and interfering with the normal action of the voltage amplifier.

The D. C. input signal is compared to a variable standard voltage and the result of said comparison is the effective D. C. input signal to the regulator. Thus the conditions to be maintained by the regulator are determined by the value of the standard voltage chosen. The comparison is made by a control network 214 composed of a battery 216, fixed resistances 217 and 218 and variable resistances 219, 221 and 222. By setting said variable resistances any desired part of the standard voltage from battery 216 is compared to the D. C. input signal.

The effective D. C. input signal resulting from the comparison in the control unit 214 is applied to the reed 228 of a mechanical converter 223, the points 226 and 227 of which are connected across the primary winding of an input transformer 232. A connection is made between the positive side of the shunt resistor 213 to the center tap of said input transformer to complete the circuit for the D. C. input signal.

The magnet windings 210 are operated ungrounded to minimize the destructive effects of accidental grounds within the windings. Thus the shunt 213 cannot be operated at ground potential as shown in Fig. 1 and the input circuit of the regulator must operate at a potential differing from ground by a voltage of as much as several hundred volts D. C. as well as varying with respect to ground at the commutating frequency of the main generator.

In order to overcome these difficulties the positive generator lead 208 is grounded through a capacitor 220 thereby causing most of the generator commutator ripple to appear in the negative current bus. However, due to distributed capacitance to ground in the magnet winding, an appreciable voltage ripple still exists between the shunt 213 and ground. Under these conditions the regulator would be called upon to amplify an effective input signal of a few microvolts in the presence of a high frequency ripple voltage that may be as much as several volts. For this reason the low level parts are surrounded by a shield 215. Said shield 215 and the "ground" bus 234 of the amplifier are connected to ground through high resistances 225 and 235 and to the positive generator lead 208 through a large capacitor 224. Thus the entire amplifier and shield are carried up and down at the commutator-ripple frequency and the low level elements inside are entirely unaware of the existence of said ripple voltage. It may be readily appreciated that were the shield omitted or directly connected to ground, the interference by the amplifier ripple would be several hundred times as strong as the regulator signal from the shunt 213. The shunt resistor 213, dampening circuit 212, control unit 214, converter 223 and input transformer 232 are all at the same D. C. potential as the positive generator lead 208 but blocking capacitors 237 and 238 inserted in the input transformer secondary allow the remainder of the circuit to operate at D. C. ground potential and at the same time carry the commutator ripple voltage.

Although it is evident that the amplifier, phase inverter and rectifier units could be modified in many ways within the spirit and scope of the invention none is herein presented. Thus the regulator elements and connections between points A—A' and B—B' are considered the same in Fig. 2 as in Fig. 1.

A conventional power rectifier unit 256 is provided to supply the proper direct current plate potentials for the vacuum tube amplifier and rectifier units. Said power rectifier 256 is energized by a regulated alternating current power supply 230 through a transformer 233. This alternating current power supply 230 also energizes the converter magnet winding 229 and signal rectifier plate circuit through transformers 233 and 231 respectively.

The output units as modified in this specific embodiment are shown following points B—B' on Fig. 2.

The output circuit of said regulator is energized by the power rectifier unit 256. Said output circuit comprises a pentode vacuum tube 240, a discharge tube 250 and a control field 254 of a high gain electromechanical power amplifier 260. Said power amplifier 260 supplies field excitation current for the field 264 of the main generator 211. The cathode 245 of tube 240 is connected through a biasing resistor 247 to the zero potential terminal of said power rectifier 256 and the suppressor grid 242 is tied directly to said cathode 245. The screen grid 243 is maintained at a constant potential by said power rectifier 256 and the plate 241 is connected in series with a resistor 253 and a control field 254 of said electromechanical power amplifier 260.

The regulator signal from the amplifier and rectifier units is impressed on the control grid 244 of tube 240 thereby varying the impedance of said tube in conformity with said signal and therefore controlling the current to the control field 254 of said power amplifier 260. A discharge tube 250 is connected in parallel with the resistor 253 and control field 254 with its plate 251 tied to the plate 241 of tube 240, and its cathode 252 connected to the high potential tap-off power rectifier 256. Said discharge tube is inserted to limit the current to the control field 254 and to protect tube 240 from inductive voltage surges arising from abrupt changes in said control field current.

The high gain electromechanical power amplifier 260 is a direct current generator connected as follows: the original set of brushes are short circuited, a second set of brushes is placed at right angles to the first with the generator output appearing between the brushes of this second set, a compensating field 261 is placed in series in the positive output lead, a resistor 263 and a control field 262 is connected across the output leads, and another control field 254 is separately excited as described above. The D. C. generator arranged as described is analogous to a two-stage amplifier unit and produces an amplification of the order of thousands. The control field 262 is connected so as to produce a flux in opposition to that of control field 254, thus a negative feedback occurs within the generator which makes the control characteristics practically linear at an easily afforded reduction in the over-all power gain.

As the signal applied to the output vacuum tube 240 controls the impedance of said tube, and the signal applied to the control field 254 of the power amplifier 260 depends upon the value of said impedance; then the output of said power amplifier 260 varies in accordance with the signal applied to the output tube 240. Furthermore, as the output of the high gain electromechanical power amplifier excites the field 264 of the main generator 211, the output of said main generator 211 responds to the signal applied to the output stage, said signal being in turn proportional to the potential across said shunt resistor 213, and thereby providing a control for the main generator so as to maintain its output constant within the desired limits.

While the foregoing description has presented the preferred embodiments of the invention it will be apparent to those skilled in the art that many modifications are possible within the spirit and scope of the invention and it is not intended to limit the invention to the details described except as may be defined in the following claims.

What is claimed is:

1. In a magnet regulator of the type regulating the magnet winding current and comprising a magnet generator, means to compare the input signal to a reference voltage, a converter to change the result of said comparison to an alternating current signal, an alternating current amplifier unit, a rectifier, a variable impedance output unit, and a power amplifier controlling the magnet generator; a voltage divider connected between said rectifier and said variable impedance output unit to reduce the signal to said output unit whereby said amplification unit operates at its point of maximum efficiency, and a dampening transformer having its primary winding connected in the magnet winding circuit and its secondary winding connected across said converter, thereby providing an opposing regulator input signal for particular load fluctuations.

2. In a magnet regulator of the type regulating the magnet winding current and comprising a magnet generator, means to compare the input signal to a reference voltage, a converter to change the result of said comparison to an alternating current signal, an alternating current amplifier unit, a rectifier, a variable impedance output unit, and a power amplifier controlling the magnet generator; a voltage divider connected between said rectifier and said output unit whereby said amplification unit operates in its range of maximum efficiency, a feedback circuit integral with said amplification unit, a regulated source of power for said amplification unit, and resistors arranged in series with the control elements of said variable impedance output unit to suppress parasitic oscillations.

3. In a magnet regulator of the type regulating the magnet winding current and comprising comparison means to compare the input signal to a reference voltage, a converter to change the result of said comparison to an alternating current signal, an alternating current amplifier unit, a rectifier, a variable impedance output unit, and a power amplifier controlling the magnet generator; a resistance-capacitance network comprising a plurality of resistors and a capacitor connected in series across the magnet windings, and a capacitor connected in parallel with a pair of said resistors, electrical connecting means impressing the potential across one of said pair of resistors upon said comparison network as a dampening signal in opposition to the regulator input signal thereby counteracting any regulator hunting action, and further characterized by a shield and attendant circuit elements including a grounding resistor and a capacitance connection to the magnet windings thereby allowing the magnet windings to be operated ungrounded.

4. In a magnet regulator of the type regulating the magnet winding current and comprising means to compare the input signal to a reference voltage, a series combination of a converter to change the result of said comparison to an alternating current signal, an alternating current amplifier unit, a rectifier to change the output of said amplifier to a direct current signal, a variable impedance output unit controlled by the direct current signal from said rectifier, an amplidyne having control fields, one of said control fields being coupled to said variable impedance output unit and influenced thereby, said amplidyne supplying excitation current to the magnet generator, and a shield about the low voltage portion of said regulator, said shield being grounded through a resistor and capacitance coupled to the magnet windings thereby allowing the magnet windings to be operated ungrounded without impairing the accuracy of regulation.

5. In a magnet regulator of the type regulating the magnet winding current and comprising positive and negative generator buses, a magnet generator energizing a magnet through said buses, a shunt resistor in the positive generator bus, means to compare the input signal from the shunt resistor to a reference voltage, a converter changing the result of said comparison to an alternating current signal, an alternating current amplifier unit, a rectifier, and a variable impedance output unit; a high gain electromechanical power amplifier having control fields, at least one of said fields being influenced by said variable impedance output unit, said power amplifier in turn influencing the magnet generator, a shield enveloping the regulator circuit ahead of the amplifier unit, said shield acting as ground for the regulator circuit and being itself grounded through resistors as well as being connected to the positive generator bus through a condenser, and in combination with said shield, blocking condensers provided just ahead of said amplifier unit, said shield allowing the magnet windings to be operated ungrounded.

6. In a magnet regulator of the type regulating the magnet winding current and comprising means to compare the input signal to a reference voltage, a converter to change the result of said comparison to an alternating current signal, an alternating current amplifier unit, a rectifier, and a variable impedance output unit; a high gain electromechanical power amplifier having a plurality of control fields, at least one of which is influenced by said variable impedance output unit, the remainder of said control fields being connected to produce a counter electromotive force within said power amplifier thereby resulting in the output of said power amplifier assuming a linear relationship with the signal supplied said output unit, and further means impressing the output of said electro-mechanical power amplifier upon the control means of the magnet generator.

7. In a magnet regulator of the type regulating the magnet winding current and comprising means to compare the input signal to a reference voltage, a series combination of a converter to change the result of said comparison to an alternating current signal, an alternating current amplifier unit, a rectifier to change the output of said amplifier to a direct current signal, a variable impedance output unit controlled by the direct current signal from said rectifier, a voltage divider directly following said rectifier enabling said amplifier unit to operate at its point of maximum efficiency, an auxiliary direct current generator with commutator brushes placed as usual, said brushes being short circuited and another set of brushes provided ninety electrical degrees from the first, positive and negative leads connected to these other brushes with the generator output appearing between them, an auxiliary generator compensating field connected in series in said positive lead and an auxiliary generator control field externally excited as dictated by said variable impedance output unit, means influencing the magnet generator with the output of said auxiliary generator, and further means, constituting a shield and associated circuit elements, permitting said magnet windings to be operated ungrounded without impairing the accuracy or effectiveness of regulation.

References Cited in the file of this patent

UNITED STATES PATENTS

| | | |
|---|---|---|
| 2,102,671 | Black | Dec. 21, 1937 |
| 2,237,016 | Stratton | Apr. 1, 1941 |
| 2,452,611 | Stratton | Nov. 2, 1948 |